US011779187B2

(12) United States Patent
Policicchio

(10) Patent No.: US 11,779,187 B2
(45) Date of Patent: Oct. 10, 2023

(54) CLEANING ARTICLE HAVING MULTI-LAYER GATHER STRIP ELEMENT

(71) Applicant: The Procter & Gamble Company, Cincinnati, OH (US)

(72) Inventor: Nicola John Policicchio, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/524,101

(22) Filed: Nov. 11, 2021

(65) Prior Publication Data
US 2022/0061624 A1 Mar. 3, 2022

Related U.S. Application Data

(62) Division of application No. 14/755,345, filed on Jun. 30, 2015, now Pat. No. 11,229,343.

(51) Int. Cl.
*A47L 13/16* (2006.01)
*A47L 13/255* (2006.01)
(Continued)

(52) U.S. Cl.
CPC .............. *A47L 13/16* (2013.01); *A47L 13/252* (2013.01); *A47L 13/255* (2013.01); *B32B 3/04* (2013.01); *B32B 3/085* (2013.01); *B32B 3/28* (2013.01); *B32B 5/022* (2013.01); *A47L 13/22* (2013.01); *A47L 13/44* (2013.01); *B08B 1/006* (2013.01);
(Continued)

(58) Field of Classification Search
CPC ........ A47L 13/16; A47L 13/20; A47L 13/255; A47L 13/252; B32B 3/04; B32B 3/28; B32B 3/085; B32B 2432/00

USPC ..... 15/229.1, 229.2, 229.3, 229.4, 208, 223, 15/209.1, 226, 229.6, 229.8
See application file for complete search history.

(56) References Cited

U.S. PATENT DOCUMENTS 823,725 A 6/1906 Hayden
4,145,787 A 3/1979 Bastian
(Continued)

FOREIGN PATENT DOCUMENTS

EP 2080470 A1 7/2009
JP H09131288 A 5/1997
(Continued)

OTHER PUBLICATIONS

PCT Search Report and Written Opinion for PCT/US/2016/036281 dated Aug. 31, 2016, 9 pages.
(Continued)

*Primary Examiner* — Anne M Kozak
*Assistant Examiner* — Makena S Markman
(74) *Attorney, Agent, or Firm* — Gary J. Foose

(57) ABSTRACT

A cleaning article. The cleaning article has a laminate construction. The cleaning article comprises a sheet and a hydrophilic gather strip element joined together at an elongate bond. The gather strip element has plural layers folded upon one another, providing strips extending outwardly from the bond. The folded layers provide a construction which allows the strips to advantageously present a dynamically changing area to the target surface during cleaning, under normal usage conditions. By changing the surface area, more liquids, and associated debris, can be cleaned from the target surface.

4 Claims, 7 Drawing Sheets

(51) Int. Cl.
  *B32B 3/04* (2006.01)
  *B32B 3/08* (2006.01)
  *B32B 5/02* (2006.01)
  *B08B 1/00* (2006.01)
  *A47L 13/252* (2006.01)
  *B32B 3/28* (2006.01)
  *A47L 13/22* (2006.01)
  *A47L 13/44* (2006.01)

(52) U.S. Cl.
  CPC . *B32B 2262/0253* (2013.01); *B32B 2262/062* (2013.01); *B32B 2307/726* (2013.01); *B32B 2307/728* (2013.01); *B32B 2432/00* (2013.01)

(56) References Cited

U.S. PATENT DOCUMENTS

| | | | |
|---|---|---|---|
| 4,951,341 A | 8/1990 | Shears | |
| 5,199,130 A | 4/1993 | Lazar | |
| 5,217,787 A | 6/1993 | Monahan | |
| 5,855,204 A | 1/1999 | Gray et al. | |
| 5,960,508 A | 10/1999 | Holt | |
| 6,003,191 A | 12/1999 | Sherry | |
| 6,048,123 A | 4/2000 | Holt | |
| 6,245,413 B1 | 6/2001 | Kenmochi | |
| 6,681,434 B2 | 1/2004 | Smith | |
| 6,701,567 B2 | 3/2004 | Smith | |
| 6,766,552 B1 | 7/2004 | Policicchio | |
| 6,813,801 B2 | 11/2004 | Tanaka | |
| 7,003,856 B2 | 2/2006 | Hayashi et al. | |
| 7,028,364 B2 | 4/2006 | Policicchio | |
| 7,182,537 B2 | 2/2007 | Policicchio et al. | |
| 7,191,486 B1 | 3/2007 | Michelson | |
| 7,458,128 B2 | 12/2008 | Smith | |
| 7,480,956 B2 | 1/2009 | Policicchio | |
| 7,566,671 B2 | 7/2009 | Hoadley | |
| 7,624,468 B2 | 12/2009 | Reddy | |
| 7,694,379 B2 | 4/2010 | Glaug | |
| 7,721,381 B2 | 5/2010 | Michelson | |
| 7,779,502 B2 | 8/2010 | Fujiwara et al. | |
| 7,803,726 B2* | 9/2010 | Policicchio | A47L 13/38 442/373 |
| 7,902,095 B2 | 3/2011 | Hassonjee et al. | |
| 7,937,797 B2 | 5/2011 | Tsuchiya et al. | |
| 8,146,197 B2 | 4/2012 | Yamada | |
| 8,151,402 B2 | 4/2012 | Takabayashi et al. | |
| 8,161,594 B2* | 4/2012 | Policicchio | A47L 13/38 15/209.1 |
| 8,186,001 B2 | 5/2012 | Tsuchiya | |
| 8,245,349 B2 | 8/2012 | Tsuchiya et al. | |
| 8,341,797 B2 | 1/2013 | Young | |
| 8,528,151 B2* | 9/2013 | Przepasniak | A47L 13/20 15/229.3 |
| 8,707,505 B2 | 4/2014 | Maranghi | |
| 8,756,746 B2 | 6/2014 | Policicchio | |
| 8,763,197 B2 | 7/2014 | Policicchio | |
| 8,863,347 B2 | 10/2014 | Wildeman | |
| 8,893,347 B2* | 11/2014 | Przepasniak | A47L 13/38 15/229.3 |
| 9,032,577 B2 | 5/2015 | Colangelo | |
| 9,833,118 B2 | 12/2017 | Policicchio | |
| 2003/0044569 A1 | 3/2003 | Kacher | |
| 2003/0127108 A1 | 7/2003 | Policicchio | |
| 2004/0128786 A1 | 7/2004 | Policicchio | |
| 2006/0135026 A1 | 6/2006 | Arendt et al. | |
| 2006/0143847 A1 | 7/2006 | Vinson et al. | |
| 2006/0171764 A1 | 8/2006 | Hoadley | |
| 2006/0282969 A1 | 12/2006 | Yamada | |
| 2008/0028560 A1 | 2/2008 | Policicchio | |
| 2009/0307860 A1 | 12/2009 | Tsuchiya et al. | |
| 2011/0041274 A1 | 2/2011 | Ogale | |
| 2013/0232711 A1 | 9/2013 | Cooper | |
| 2017/0000308 A1 | 1/2017 | Policicchio | |
| 2017/0360271 A1 | 12/2017 | Policicchio | |

FOREIGN PATENT DOCUMENTS

| | | |
|---|---|---|
| JP | 2011041736 A | 8/2009 |
| JP | 2012254262 A | 12/2012 |
| WO | 2016161235 A1 | 10/2016 |

OTHER PUBLICATIONS

All Office Actions, U.S. Appl. No. 14/755,345, filed Jun. 30, 2015.
All Office Actions, U.S. Appl. No. 15/692,165, filed Aug. 31, 2017.
All Office Actions; U.S. Appl. No. 14/755,506, filed Jun. 30, 2015.
All Office Actions; U.S. Appl. No. 17/506,344, filed Oct. 20, 2021.
Simple Solution; Twin-Head Sweeper Refill Pads; Purchasedjune, 2015; Refill Pad Enclosed; Sold by the Bramton Company,LLC.
U.S. Unpublished U.S. Appl. No. 17/506,344, filed Oct. 20, 2021, to Nicola John Policicchio.

* cited by examiner

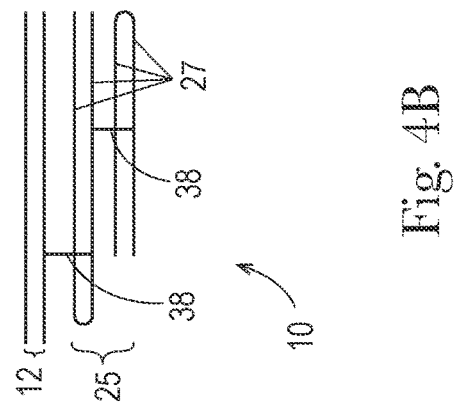
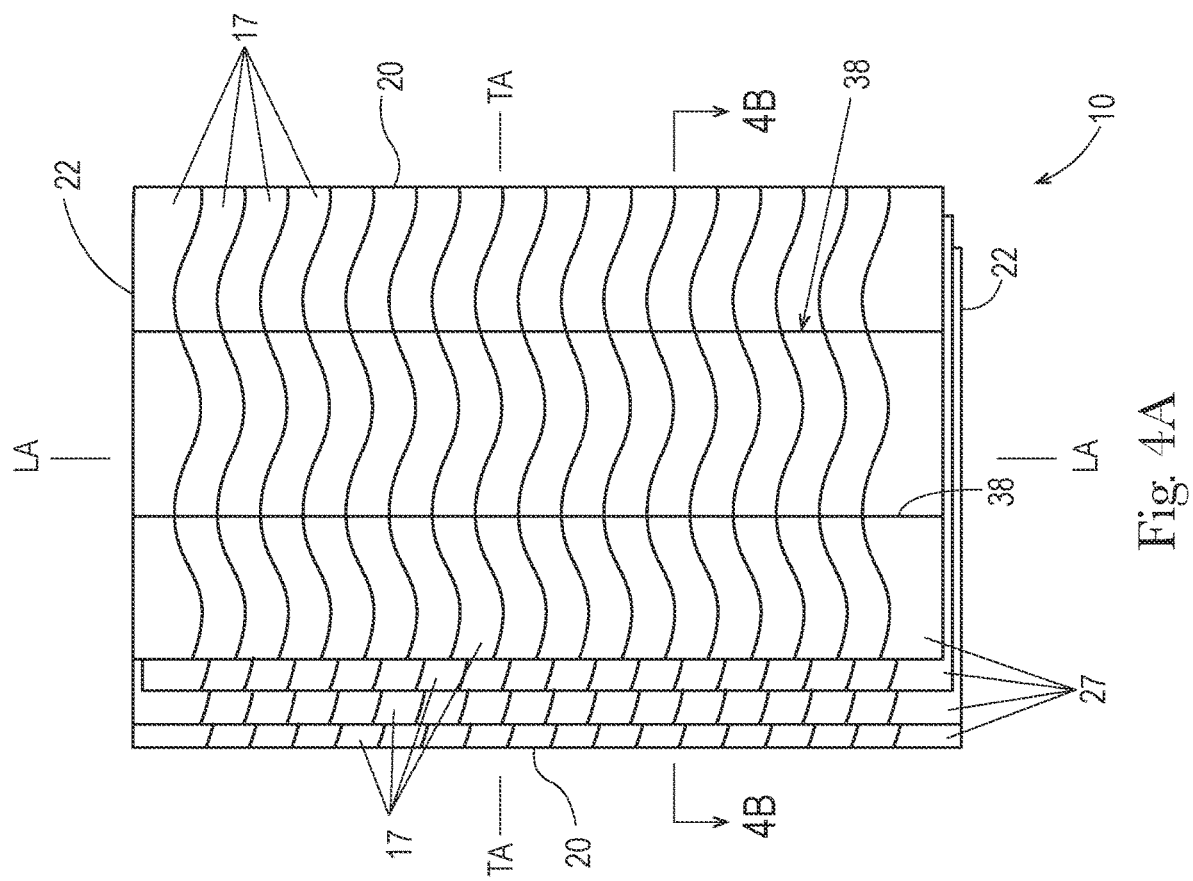

CLEANING ARTICLE HAVING MULTI-LAYER GATHER STRIP ELEMENT

FIELD OF THE INVENTION

The present invention relates to cleaning articles, more particularly to cleaning articles for absorbing cleaning fluid from a target surface.

BACKGROUND OF THE INVENTION

Various cleaning articles have been created for dusting and light cleaning. For example, cloth rags and paper towels used dry or wetted with polishing and cleaning compositions have been used on relatively flat surfaces such as countertops, showers, sinks and floors. But, rags and paper towels are problematic for reasons such as hygiene (the user's hand may touch chemicals, dirt or the surface during cleaning), reach (it may be difficult to insert the user's hand with the rag or paper towel into hard-to-reach places) and inconvenience (cleaning between closely-spaced articles typically requires moving the articles).

To overcome the problems associated with using rags and paper towels, various reusable dust gathering devices using felt and hair have been utilized for more than a century, as illustrated by U.S. Pat. No. 823,725 issued in 1906 to Hayden and using yarns as illustrated in U.S. Pat. No. 4,145,787. To address the problems with reusable dust gathering devices, disposable cleaning articles have been developed which have limited re-usability. These disposable cleaning articles may include brush portions made of synthetic fiber bundles, called tow fibers, attached to a sheet as shown in U.S. Pat. Nos. 6,813,801; 7,003,856; 7,566,671; 7,779,502; 7,937,797; 8,146,197; 8,151,402; 8,161,594; 8,186,001; 8,245,349; 8,528,151; 8,756,746 and 8,763,197.

Disposable dusters may provide for wet cleaning as disclosed in U.S. Pat. No. 7,566,671 and commonly assigned U.S. Pat. No. 7,803,726 and commonly assigned US 2008/0028560. But tow fibers may become matted when wet and not be suitable for cleaning a large or heavily wetted surface, such as a floor. Thus, dusters may not suitable for cleaning extremely large or heavily soiled surfaces.

To overcome the problem of large and/or heavily wetted surfaces, mops which are repeatedly dunked into a bucket of liquid have been used. But these mops become saturated and can redeposit large amounts of dirty liquid onto the floor. Accordingly, disposable floor sheets have been developed. These floor sheets may contain large amounts of absorbent cellulose, as disclosed in U.S. Pat. Nos. 7,191,486 and 7,721,381, and may include at least two interior sheets as disclosed in U.S. Pat. No. 9,032,577. Floor sheets may contain AGM to further assist in liquid absorption and retention, as disclosed in commonly assigned U.S. Pat. Nos. 5,960,508; 6,003,191; 6,048,123 and 6,766,552. But if insoluble soils are not removed from the floor, or if soluble soils are inadequately absorbed by the floor sheet, streaking and/or filming may occur.

One attempt to clean overcome this problem is found in microfiber cleaning pads. Microfiber pads may be nylon and are intended to be washed and reused. But, as discussed below, microfiber pads may damage the floor and still leave filming/streaking.

This problem is exacerbated by some of the newer floor materials. For example, certain new flooring materials are relatively dark in color. Newer flooring materials may have relatively high gloss levels, and/or be difficult to wet during cleaning, due to surface energy. These properties may highlight filming/streaking which is left on the floor after wet cleaning, even if damage to the floor does not occur.

Yet other attempts to make cleaning pads incorporate both hydrophobic and hydrophilic properties, as disclosed in U.S. Pat. No. 7,694,379 and commonly assigned U.S. Pat. No. 7,480,956. Another attempt includes free floating cuffs, as disclosed in commonly assigned U.S. Pat. No. 7,028,364. Other relevant attempts in the art include US 2003/0300991; 2011/0041274; 6,245,413; 6,681,434; 6,701,567; 7,458,128; 7,624,468; 8,341,797; 8,707,505 and 8,863,347.

While these attempts are directed to absorption of liquids from a wetted target surface, particularly a floor, problems remain. A generally flat floor sheet presents the same surface to throughout the cleaning task. Dirt can be re-deposited if the floor sheet is saturated. And a generally flat floor sheet may not adequately clean into floor crevices or grout lines. Damage to the floor may occur if a reusable microfiber floor pad is used.

Thus, there is a need for a disposable, generally planar cleaning article, usable on wetted surface and which presents dynamically changing surface throughout the cleaning task.

SUMMARY OF THE INVENTION

The invention comprises a cleaning article having a laminate construction. The cleaning article comprises a sheet and a hydrophilic gather strip element joined together at an elongate bond. The gather strip element comprises plural superimposed layers folded upon one another. A plurality of the layers have strips extending outwardly from the bond

BRIEF DESCRIPTION OF THE DRAWINGS

FIG. 4A is a bottom plan view of an alternative embodiment having two central bond lines.

FIG. 4B is a vertical sectional view taken along line 4B-4B of FIG. 4A.

DETAILED DESCRIPTION OF THE INVENTION

Figure 1:
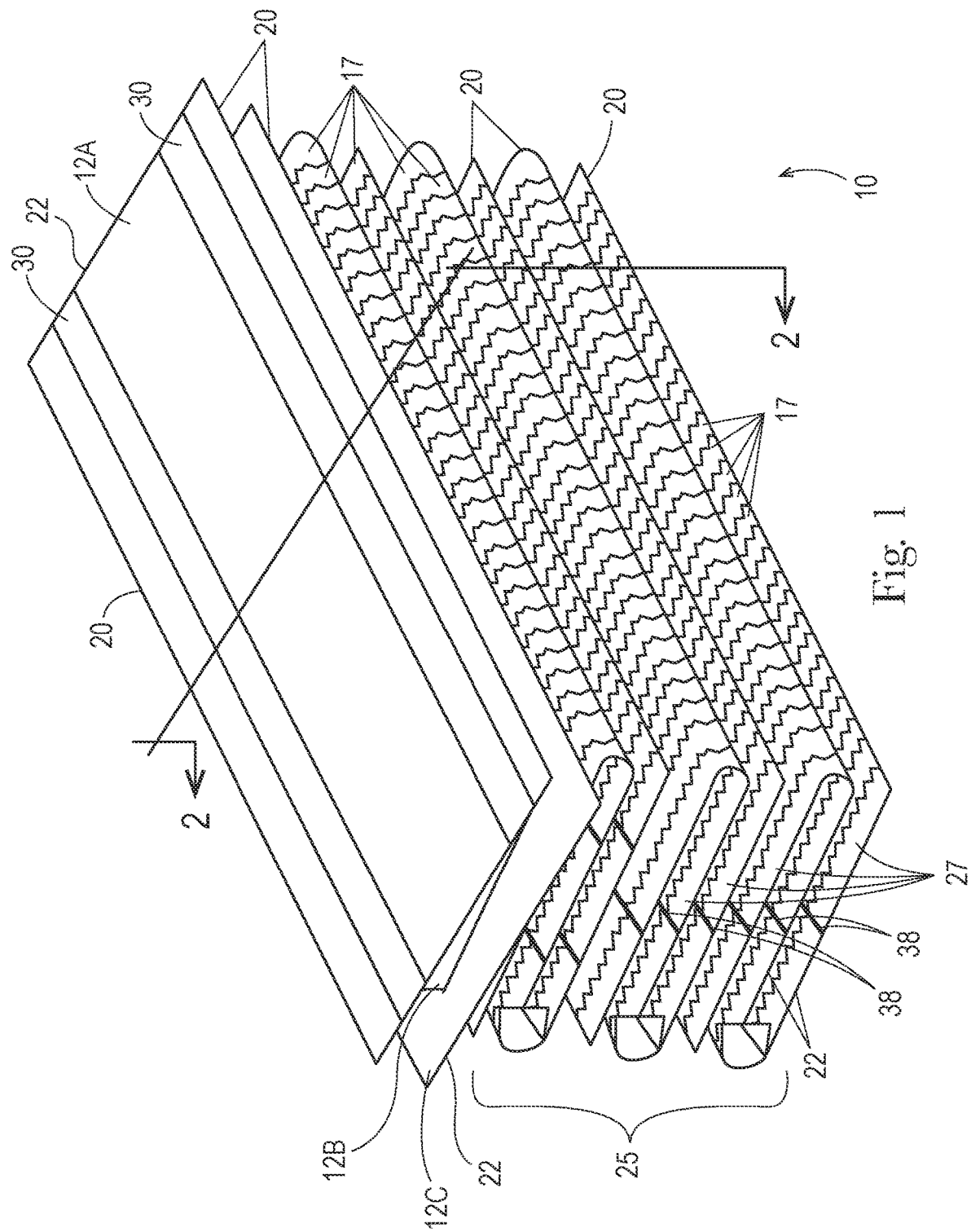
FIG. 1 is an exploded perspective view of a cleaning article according to the present invention.

Referring to FIG. 1, the cleaning article 10 may be generally elongate, and rectangular, although other shapes are contemplated and feasible. The cleaning article 10 may comprise two or more components joined in a laminate form to provide cleaning article 10 suitable for floor cleaning. The cleaning article may have a sheet 12, which forms a frame for attachment of other components thereto. The cleaning article 10 may also have a gather strip element 25, having plural layers 27 of stacked, outwardly extending, flexible strips 17. An absorbent core may be disposed between the gather strip element 25 and the sheet 12.

The cleaning article 10 may be disposable. By disposable it is meant that the cleaning article 10 is used for one cleaning task, or generally not more than several square meters, then discarded. In contrast, a reusable cleaning article 10 is laundered or otherwise restored after use.

The cleaning article 10 has at least two, more preferably at least three, four or more laminae joined/folded in laminate form the cleaning article 10. The sheet 12 may also provide for attachment to a floor cleaning implement as described below. As used herein, unless otherwise specified, being joined includes a direct and contacting relationship between two components and a relationship having an intermediate component therebetween.

The cleaning article 10 may have a longitudinal axis LA and a transverse axis TA orthogonal thereto. The cleaning article 10, and respective components thereof, may have two longitudinal edges 20 parallel to the longitudinal axis LA and two transverse edges 22 parallel to the transverse axis TA.

As discussed below the strips 17 may be advantageously substantially, or preferably entirely, contained within the footprint of the sheet 12. Particularly, the distal ends of the strips 17 may be contained within and bounded by the footprint defined by the two longitudinal edges 20 and two transverse edges 22 of the sheet 12. This arrangement is believed to promote mobility of the strips 17 in use, and present a dynamic surface area of the cleaning article 10 to the target surface in use, due to the direct pressure the strip 17 encounter when the user presses a cleaning implement against a floor.

The length of the cleaning article 10 is taken in the longitudinal direction. The width of the cleaning article 10 corresponds to the transverse direction perpendicular to the length direction and disposed within the plane of the sheet 12. The thickness is defined as the dimension in the z-direction. The XY plane is defined as the plane defined by the cleaning article 10. The Z-direction of the cleaning article 10 is the direction perpendicular to the plane of the sheet. The cleaning article 10 may have a length from 20 to 50 cm and a width of 10 to 20 cm. The cleaning article may particularly be 30+/−2 cm long by 14+/−2 cm wide, as measured at the greatest dimensions, in order to fit the head of a typical cleaning implement 70, as discussed below. The optional core may particularly have a width of 6.5+/−2 cm and a length of 26+/−2 cm. Of course, one of skill will recognize that other shapes are feasible and within the scope of the present invention.

The cleaning article 10 may have an outwardly facing cleaning side and an attachment side opposed thereto. The attachment side of the cleaning article 10 may have one or more attachment stripes 30 for attachment to the head of an implement, two parallel stripes 30 being illustrated for example. The stripes 30 may comprise loop material suitable for complementary attachment to a head of a cleaning implement having hooks.

The cleaning article 10 may be thought of as having one lamina or having two, three or more laminae joined in face-to-face relationship. The laminae may be refolded in serpentine fashion to provide a plurality of laminae in the Z-direction.

More particularly, the cleaning article may comprise a construction of at least one sheet 12 and at least one gather strip element 25. The sheet 12 and gather strip element 25 are joined in face-to-face relationship with at least one permanent bond to form a laminate.

The sheet 12 may serve as a chassis for attachment of the gather strip element 25 thereto. Other laminae and features may be interposed between the sheet 12 and gather strip element 25, without departure from the invention.

The sheet 12 may particularly comprise a synthetic nonwoven sheet 12. A sheet 12 having synthetic fibers provides for convenient joining of the gather strip element 25 thereto. Nonwovens include spun bonded, carded and airlaid materials, as are known in the art and made from synthetic fibers. A suitable nonwoven sheet may be made according to commonly assigned U.S. Pat. No. 6,797,357.

Preferably the sheet 12 comprises cellulose, to provide absorptive capacity. A cellulosic sheet 12 may have permanent wet strength resin added thereto, as is known in the art. Or the sheet 12 may preferably comprise a mixture of cellulosic and synthetic fibers, to provide both absorptive and barrier properties, and for convenient joining of the gather strip element 25. By cellulosic it is meant that the component comprises a predominant weight percentage of cellulosic fibers.

The sheet 12 and/or gather strip element 25 may be hydrophilic, to advantageously absorb water from the surface being cleaned. By hydrophilic it is generally meant that the component will absorb water in use and retain such water in ordinary use without the application of excessive compressive force.

Particularly hydrophilic vs hydrophobic properties may be measured as follows. A 1 gram sample of material, is oven dried at about 110° C. for 12 hours, then conditioning at 65% relative humidity/21° C. for five days. The sample is then re-dried at 110° C. for 12 hours The amount of moisture gained is measured as a percentage of moisture regained:

moisture regained=[(total conditioned sample weight at 65% RH−sample weight after drying)÷dried sample weight]×100%.

As used herein, hydrophilic material has a moisture regain at 65% greater than about 2%, 3%, 4%, 5% and preferably greater than about 6%. Table 1 below shows comparisons of different fiber types for % moisture regain at equilibrium in 65% RH.

TABLE 1

| Moisture Regain (Percentage) | | | | | | | | |
|---|---|---|---|---|---|---|---|---|
| Hydrophilic Fibers | | | | | Hydrophobic fibers | | | |
| Cellulose | Rayon | Cotton | Acetate | Tri-acetate | Polyester | Acrylic | Polyethylene | Polypropylene |
| 12-15 | 11-13 | 7-8 | 6.0-6.5 | 4.0-4.5 | 0.4 | 1.5-2.0 | <0.1 | <0.1 |

While hydrophilic materials may be useful for the invention described herein, such materials may not have sufficient strength for use in even a disposable cleaning article 10. Thus, the selection of proper materials is important.

For example, if the gather strips 17 are 100% cellulose a wet co-efficient of friction may be so great it is difficult for a user to move cleaning article 10 across a particular target surface. By intermixing different materials surface area for soil collection can be maintained while the wet coefficient of friction is optimized. Likewise, using gather strips 17 of varying lengths, even with the same material, can increase cleaning surface area without unduly increasing wet coefficient of friction, providing for ease of movement across the target surface.

Figure 2A:
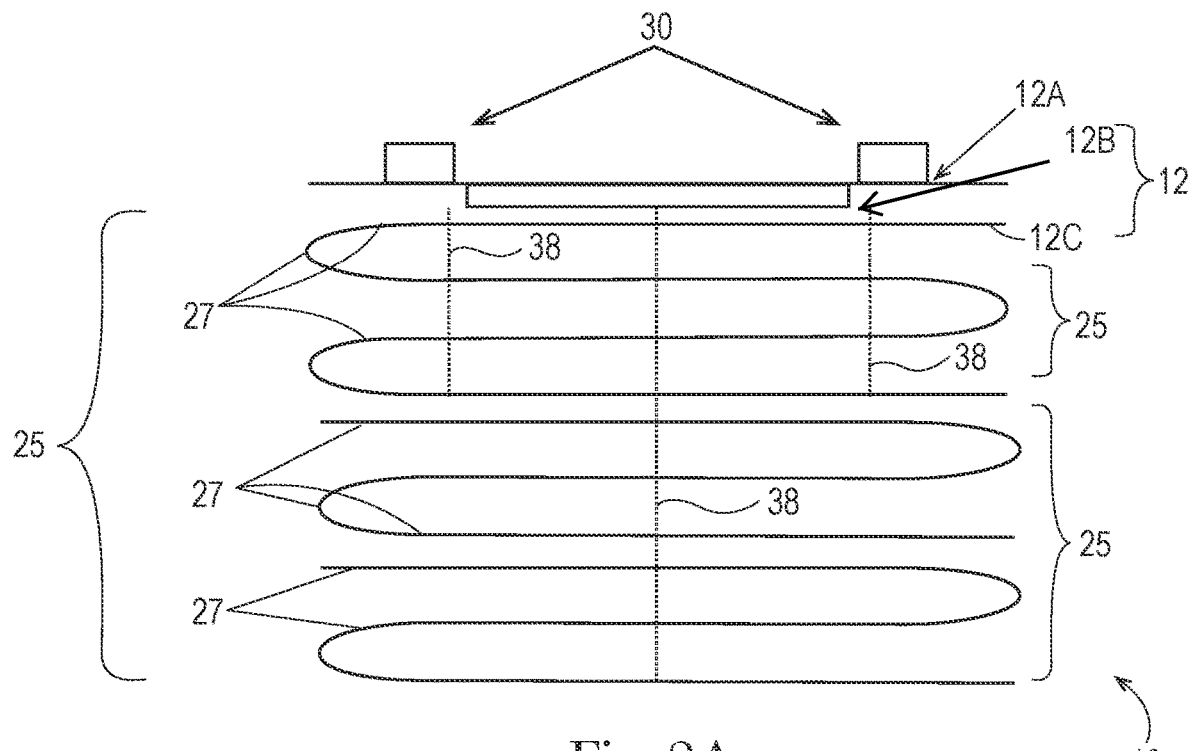
FIG. 2A is to scale and is a vertical sectional view taken along lines 2-2 of FIG. 1.
Figure 2B:
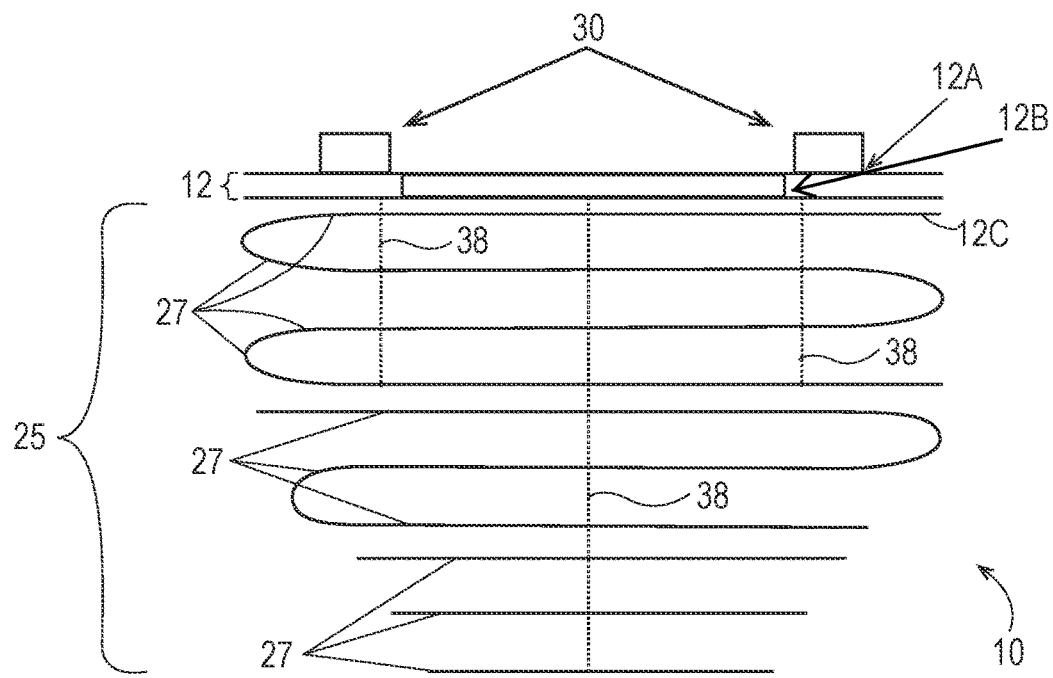
FIG. 2B is a vertical sectional view of an alternative embodiment cleaning article having an inverted pyramidal geometry.

Referring to FIGS. 2A and 2B, the sheet 12 may comprise a laminate of two, three or more plies. The laminate may particularly comprise three plies, an outwardly facing ply 12A for contact with a cleaning implement, a central ply/core 12B for absorption and an inwardly facing ply 12C for joining to the gather strip element 25.

The outwardly facing ply 12A may comprise a hydroentangled spunbond nonwoven with a basis weight of 20 to 80 gsm. A 45 gsm nonwoven from Avgol Nonwovens of Tel-Aviv, Israel has been found suitable. As used herein a nonwoven is a component having a mixture of airlaid and/or wetlaid fibers not woven together.

The central ply/core 12B may serve as a storage reservoir, to absorb and retain liquids collected from the target surface by the gather strip element 25. The central ply/core 12B may comprise a bicomponent cellulose/synthetic airlaid. A 135 gsm airlaid comprising 85:15 cellulose:bicomponent fibers available from Suominen of Helsinki, Finland is suitable.

The central ply/core 12B may further comprise absorbent gelling materials [AGM], as are known in the art. The AGM may increase retention of absorbed liquid and provide for increased capacity of the cleaning article 10. The cleaning article 10 may be free of foam, to conserve costs.

The inwardly facing ply 12C may comprise a mixture of wet laid fibers formed into a tissue which is bonded onto a synthetic nonwoven using process such as spun lace or hydroentangling. The inwardly facing ply 12C may comprise 23 gsm tissue with a 17 gsm polypropylene spunbond as a composite, sold under the name Genesis tissue by Suominen of Helsinki, Finland. If desired, a dedicated core 12B may be incorporated into the cleaning article 10. The dedicated core 12B may be between any of the plies 12A, 12C of sheet 12 or disposed on the inwardly or outwardly oriented face of sheet 12. The core 12B may particularly comprise the central ply. The core 12B and/or additional/alternative central ply may be narrower than the outwardly facing ply 12A and inwardly facing ply 12C. The core 12B and/or central ply may be about half of the width of the outwardly facing ply 12A and inwardly facing ply 12C, and centered on the longitudinal axis. Particularly the width of the core 12B and/or central ply may be less than or equivalent to the spacing between the stripes 30 of attachment material.

The width of the core 12B and/or sheet 12 and gather strip element 25 is measured as follows. The cleaning article 10 is placed on a flat, horizontal surface. Wrinkles and other disruptions to general planarity are smoothed out. The cleaning article is held taut by fingertips. A Steel Rule, Slide Calipers or Toolmakers' Grade Square, as are commonly available from L.S. Starrett Co. of Athol, Mass. is used to measure the width between opposed ends of the gather strips 17 and the core 12B. Outwardly facing plies 12A, 12C and layers 27 may be removed, as necessary, to provide unobstructed access for the measurements.

The width of the core 12B is measured in the transverse direction, parallel to the transverse axis. If the core 12B has variable width, the width is measured at the narrowest point. The width of the gather strip element 25 is also measured in the transverse direction. The width of the gather strip element 25 is measured between the distal ends of opposed gather strips 17 oppositely disposed across the longitudinal axis and lying in the XY plane. If the gather strip element 25, and particularly the opposed ends of the gather strips 17 has variable width, the width is measured at the widest point. A difference in width of at least 4, 6, 8, 10, 12 or 14 cm, equally divided across the longitudinal axis, is believed suitable for the embodiment described herein.

The difference in width between the opposed gather strips 17 and the core 12B is believed to promote stability of the core 12B and/or central ply 12B, for retaining liquids transferred from the gather strip element 25. Furthermore, this geometry is believed to assist in draining the gather strips 17 of absorbed liquid. Further, this geometry provides a gap, which is believed to promote movement of the gather strips 17, presenting different portions thereof to the target surface in response to user movement of the cleaning article 10 during ordinary use.

The three plies 12A, 12B and 12C may be permanently joined together using adhesive and/or thermal bonds as are known in the art to form sheet 12. Optional attachment stripes 30 of loop material may be joined to the outwardly facing surface of outwardly ply 12A to removably join the cleaning article 10 to a handle 60 or implement. The stripes 30 may be continuous or discontinuous.

Figure 3:
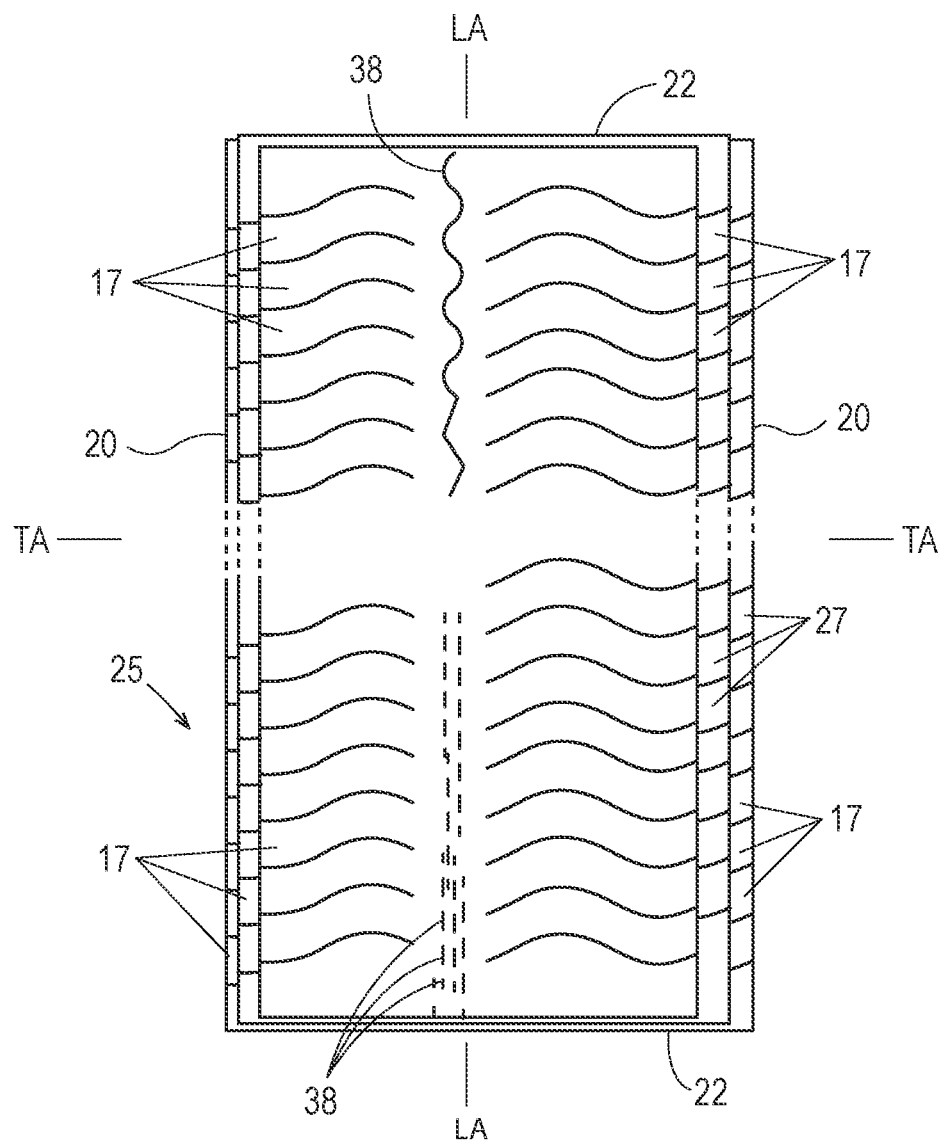
FIG. 3 is a broken bottom plan view of an alternative embodiment having a non-straight central bond line and inverted pyramidal geometry, with the upper portion having a sinusoidal bond and the lower portion having spot bonds.

Referring to FIG. 3, the cleaning article 10 may further comprise hydrophilic gather strips 17 disposed in a gather strip element 25. As used herein, gather strips 17 refer to cantilevered strips extending outwardly from proximal ends to respective distal ends. The individual gather strips 17 may have a proximal end at or offset from the longitudinal centerline of the article 10, and having a length (taken in the transverse direction) greater than the corresponding width (as taken in the longitudinal direction), to provide an aspect ratio of at least 1 and optionally 2 to 20, and optionally 5 to 15. The gather strips 17 may have a length, taken from a respective proximal end juxtaposed with a bond 38 to a respective distal end, which may be juxtaposed with a transverse edge of the cleaning article, of 3 to 15, 4 to 12 or particularly 5 to 8 cm, and a width of 3 to 20, 4 to 15 or particularly 6 to 8 mm. These particular dimensions have been found suitable for use in floor cleaning, when using a cleaning implement.

The gather strips lie within the XY plane as intended by manufacture, although may be deformed out of the XY plane due to fluffing before use, and/or deformations which occur in use due to movement against the target surface. The gather strips 17 may be incorporated into one of the sheets 12 described herein or may be deployed on a separate sheet 12. The gather strips 17 may extend parallel to the width direction of the article, or may be disposed in acute angular relationship thereto. The gather strips 17 may be straight, as shown, curved, serpentine or of any desired shape.

The gather strip element 25 may comprise the same materials as described above for inwardly facing ply 12C, and particularly be hydrophilic, and more particularly cellulose. The gather strip element 25 and/or the sheet 12 may alternatively or additionally comprise microfiber, as is known in the art.

Referring back to FIGS. 2A and 2B, the gather strip element 25 may comprise one or more plies folded back on itself in serpentine fashion. This arrangement provides at least a double, triple or greater thickness. When the layer 27 is cut into generally transversely oriented individual gather strips, the double thickness provides a loop at the distal end of a respective strip 17. The loop is believed to be advantageous, as it helps to space apart strips 17 overlaid in the Z-direction.

The folded configuration may be accomplished with a c-fold as shown throughout the figures. One of skill will recognize that c-folds may be cascaded to provide a z-fold, w-fold or other plural layer folds as are known in the art and which encompass a c-fold.

The gather strip element 25 may comprise from 2 to 25, 5 to 20, and particularly about 10 layers 27 of gather strips 17, depending upon the desired absorbent capacity and texture of the intended target surface. The gather strips 17 disposed on each edge, particularly the longitudinal edges may advantageously comprise loops at the distal ends and a free end having a single thickness at the distal ends of the gather strips 17 to provide differential response during cleaning and prophetically reach and retain more debris during cleaning.

Particularly, the differential response of the gather strips is believed to present a dynamically changing surface area to the target surface during cleaning, under normal usage conditions. By changing the surface area, more liquids, and associated debris, can be cleaned from the target surface.

A non-limiting gather strip element 25 having three separate gather strip materials is shown. The upper sheet, closer to the sheet 12, is folded upon itself to provide four gather strip layers 27. The two lower gather strip 17 layers 27 are z-folded upon themselves to each provide three gather strip layers 27.

The sheet 12 and gather strip element 25 may be joined by a plurality of bonds 38, as set forth below. The bonds 38 may be thermal, adhesive or ultrasonic, etc. as are known in the art.

A central bond 38 may join all layers 27/laminae of the cleaning article 10, to ensure a unitary construction and prevent loss of individual components in use. The central bond 38 may be common to all layers 27 of the gather strip element 25, and directly or indirectly join each layer 27 of the gather strip element 25 to the sheet 12.

Two outboard bonds 38 may be provided and join only layers 27 of the gather strip element 25 proximate to the sheet 12. For the embodiment described herein the outboard bonds 38 may be transversely spaced at least about 7 cm apart on centers, so that the outboard bonds are spaced outwardly of and do not overly the core 12B. The outboard bonds 38, or the central bond 38, may be considered secondary bonds 38 if such bonds only join a portion of the layers 27 of the gather strip element 25 to the sheet 12, directly or indirectly.

Typically, all layers 27 of the gather strip element 25 are joined to the sheet 12 by at least one bond 38. The layer 27 closest to the sheet 12 may be considered the first layer 27. Succeeding layers 27 are considered relatively proximate to the sheet 12 and may be considered the second layer 27, third layer 27, fourth layer 27, etc. in turn. Layers 27 further from the sheet 12 and closest to or contacting the floor are considered distal layers 27.

The bonds 38 may be longitudinally coextensive with or slightly shorter than the sheet 12. In a less preferred embodiment, the outboard bonds may join only the portions of the gather strip element 25 which are remote from and not proximate to the sheet 12.

This arrangement provides relatively longer gather strips 17 on the target surface and shorter gather strips inward thereof. It is believed that having different lengths of gather strips improves the cleaning efficacy by allowing the gather strips 17 to move independently of each other and create separation therebetween. Such separation between gather strips 17, and particularly presenting gather strips 17 in superimposed layers, is believed important in providing sufficient area to surface being cleaned, for soil to be both efficaciously picked up and retained by the cleaning article 10. Thus the layers 27 may be made with a single fold, plural folds, or by simple superposition with no folds.

Referring back to FIG. 3, the gather strip element 25 may be joined to the sheet using a sinusoidally shaped bond 38, zig-zag bond 38, all of which are collectively referred to as a serpentine bond 38 or other non-straight bond 38. This bond 38 pattern provides both relatively longer and relatively shorter individual gather strips 17. Also, the gather strips 17 each have a respective proximal end which is not parallel to the longitudinal axis. This geometry provides a proximal end which is believed to promote twisting and disruption of the gather strip during cleaning.

Alternatively the central bond 38 may comprise an array of discrete bonds 38, as disclosed in commonly assigned EP Application Serial No. 15162895.5. Discrete bonds 38 are prophetically believed to promote the dynamically changing presentation of the gather strip element 25 to the target surface during ordinary use.

The differential length gather strips 17 are believed to present different strips 17 and/or portions thereof to the target surface in use. The irregular proximal ends of the gather strips 17 are also believed to present different strips 17, or portion thereof, to the target surface in use.

Generally, by presenting different gather strips 17 and/or different portions of gather strips 17, to the target surface in use, it is believed that saturated portions of the cleaning article 10 do not remain in contact with the target surface. Different portions of the gather strip element 25 are presented in use, minimizing re-deposition and allowing unsaturated portions of the gather strip element 25 to contact, absorb and retain liquid from the target surface. By dynamically changing the effective portions of the gather strip element 25 which contact the target surface, improved cleaning is believed to occur. Significantly, the dynamically changing effective portions of the gather strip element 25 occurs automatically and without user intervention, other than the normal back and forth strokes which are part of normal cleaning.

Preferably the cleaning article is free of tow fibers. Tow fibers, tend to matt and clump when wetted, decreasing cleaning efficacy. But in a less preferred embodiment, the cleaning article may further comprise one or more laminae of tow fibers. The tow fiber lamina may be joined to the sheet 12 or gather strip element 25 in face-to-face relationship. The tow fiber lamina may be suitable for and disposed for directly contacting the target surface during cleaning. Alternatively, the tow fiber lamina may be disposed between the sheet 12 and gather strip element 25.

The tow fibers may be synthetic. As used herein "bundle fibers" and/or "tow" refer to fibers comprising synthetic polymers including polyester, polypropylene, polyethylene, bio-derived polymers such as polylactic acid, bio-polyethylene, bio-polyester and the like. Tow fibers also include fibers from natural sources such as cellulose, cellulose acetate, flax, hemp, jute and mixtures thereof manufactured wherein the individual fibers are relatively long strands manufactured in bundles. The bundle fibers may be defined as any fibers having distinct end points and at least about 1 cm in length. The tow fibers may extend continuously and in a substantially transverse direction, between the transverse edges of the article 10.

The sheet(s) 12, gather strip element 25 and optional and tow fiber layer(s) may be joined by a plurality of permanent bonds 38. The bonds 38 are intended to minimize or prevent stray or dislodged tow fibers from becoming loose. Such sheet(s) 12, gather strip element 25 and tow fiber layer(s) may typically be directly superimposed on one another, with or without intervening members or components therebetween.

The bond(s) 38 may be formed by adhesive bonding, thermal bonding, ultrasonic bonding, etc. In thermal bonding and ultrasonic bonding, energy and compressive pressure are applied to local bond 38 sites. The synthetic sheet 12 and synthetic tow fibers are melted at such local sites. Upon refreezing, the local materials of sheet 12 and tow fibers are refreeze together at such local sites, forming localized welds which are the bonds 38.

If desired, the sheet 12 may be covered by an outwardly facing liquid impermeable barrier. The barrier prevents absorbed liquids from contacting the user's hand, implement, etc. A suitable barrier includes LDPE film as is known in the art.

Referring to FIG. 2B, the gather strip element 25 may comprise a serpentine folded member with the width decreasing as the distal edge of the gather strip element 25 is approached. This geometry provides an inverted pyramidal construction, in use. Such a construction of the gather strip element 25 may provide for plural layers 27 of the gather strip element 25 having plural widths. The widths may decrease from the first layer 27 to the distal layers 27 and may particularly monotonically decrease in width from the first layer 27 to the distal layers 27. The inverted pyramidal construction is prophetically believed to advantageously present more edges to the target surface during cleaning.

Referring to FIGS. 4A-4B, the cleaning article may be free of a common bond 38 which joins all layers 27 of the gather strip element 25 to the sheet 12. Instead, a first bond 38 may join one or more proximal layers 27 to the sheet 12. A second bond 38 may join one or more distal layers 27 to the proximal layers 27, without joining the distal layers 27 directly to the sheet. This arrangement prophetically provides the benefit that if the cleaning article 10 is particularly thick in the z-direction, a bond 38 through all components thereof is avoided.

Any of the sheet 12, gather strip element 25 and/or optional layer of tow fibers may optionally be completely or partially coated with adhesive, wax, Newtonian or non-Newtonian oils or a combination thereof, in order to improve cleaning and increase retention of absorbed debris. If desired, the cleaning article 10 may optionally be used with a cleaning solution or other solution usable for other purposes such as treating the surface for appearance or disinfectant, etc. The cleaning solution may be pre-applied to the cleaning article 10, creating a pre-moistened cleaning article 10 or may be contained within a separate reservoir for dosing onto the cleaning article 10 and/or target surface. The cleaning solution may comprise a majority water, and at least about 0.5, 2, 5 or 10 weight % solids, or at least about 30 or 50 weight % aqueous solvents, non-aqueous solutions or mixtures thereof.

Referring to FIGS. 5A-5G, various alternative gather strip elements 25 are shown. While each gather strip element 25 is show to have two layers 27, one of skill will recognize the invention is not so limited. The gather strip element 25 may have one, two, three or more layers 27, with the bonds 38 as illustrated, or with different bonds 38. One of skill will also recognize that that various combinations and hybrids of these embodiments may be combined, as desired, into a single cleaning article 10.

Figure 5A:
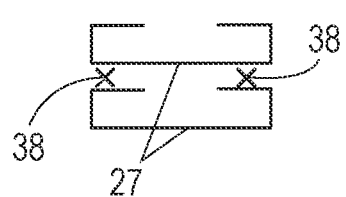
FIGS. 5A-5G are to scale and are vertical sectional views of alternative embodiments of gather strip elements, each having two sheets of material.

Referring to FIG. 5A, the gather strip element 25 may comprise two sheets of material, each sheet having an open c-fold. This arrangement is prophetically believed to advantageously provide a generally symmetrically opposite geometry, which aids in cleaning with a common back and forth motion, and provides a cleaning article 10 of generally equal thickness.

Figure 5B:
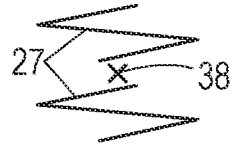

Referring to FIG. 5B, the gather strip element 25 may comprise two sheets of material, each sheet having a z-fold with shortened outer legs. This arrangement is prophetically believed to advantageously provide a generally symmetrically opposite geometry. Each longitudinal edge of the cleaning article 10 has two z-fold which provide a loop gather strip 17 and two free ends of gather strips 17. This arrangement, providing both free ends and loop ends of the gather strips 17 and generally constant thickness, is believed to aid in cleaning with a common back and forth motion.

Figure 5C:
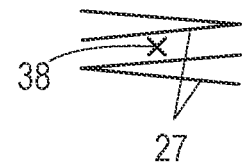

Referring to FIG. 5C, the gather strip element 25 may comprise two sheets of material, each sheet having a c-fold oriented in opposite directions. This arrangement is prophetically believed to advantageously provide a generally symmetrically opposite geometry. Each longitudinal edge of the cleaning article 10 has a c-fold which provides a loop gather strip 17 and two free ends of gather strips 17. This arrangement, providing both free ends and loop ends of the gather strips 17, is believed to aid in cleaning with a common back and forth motion.

Figure 5D:
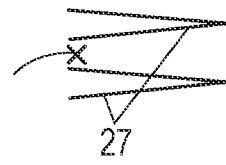

Referring to FIG. 5D, the gather strip element 25 may comprise two sheets of material, each sheet having a c-fold oriented in the same directions. This arrangement is prophetically believed to advantageously provide loop gather strips 17 on one longitudinal edge and free ends of gather strips 17 on the other longitudinal edge. This arrangement providing different types of gather strips 17 suitable for different cleaning task.

Figures 5E, 5F:
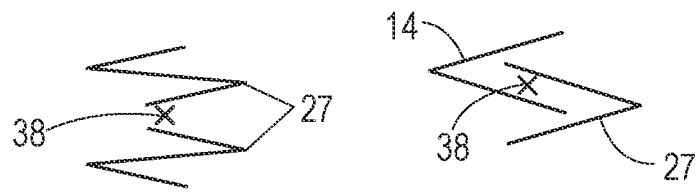

Referring to FIG. 5E, the gather strip element 25 may comprise two sheets of material, each sheet having a z-fold with shortened outer legs and arranged to provide a W-fold. This arrangement is prophetically believed to advantageously provide two outwardly facing loop gather strips on each longitudinal edge of the cleaning article 10.

Referring to FIG. 5F, the gather strip element 25 may comprise two sheets of interfolded material. This arrangement is prophetically believed to advantageously provide a generally symmetrically opposite geometry. Each longitudinal edge of the cleaning article 10 has a c-fold which provides a loop gather strip 17 and single free end of gather strips 17 with a thicker central region. Having a thicker central region, is prophetically believed having gather strips 17 which move and present different surface areas to the floor in use.

Figure 5G:
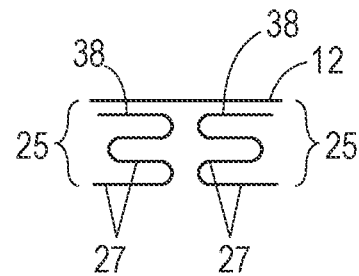

Referring to FIG. 5G the gather strip element 25 may comprise two or more independent, serpentine layers 27. Each gather strip element 25 may be joined to the sheet 12 by a dedicated bond 38. Each such gather strip element 25 may, in turn, have two outwardly extending banks of gather strips 17. The arrangement provides the benefit that additional gather strips 17 are available and inwardly oriented gather strips 17 may intertwine during use. It is prophetically believed that having different gather strips 17 with different functionalities and increases the amount of dynamic surface area presented to the floor in use.

Of course, one of skill will recognize combinations and hybrids of the foregoing alternatives are feasible and contemplated herein. For example, a cleaning article 10 may have two more lines of bonds 38. One such line of bonds 38 may be straight or all lines of bonds 38 may be non-straight. If three lines of bonds 38 are used, for example, the lines of bonds 38 may be symmetrically opposite and serpentine while the central line of bonds 38 is straight. Or a single gather strip element 25 may be joined to the sheet by plural lines of bonds.

Figure 6:
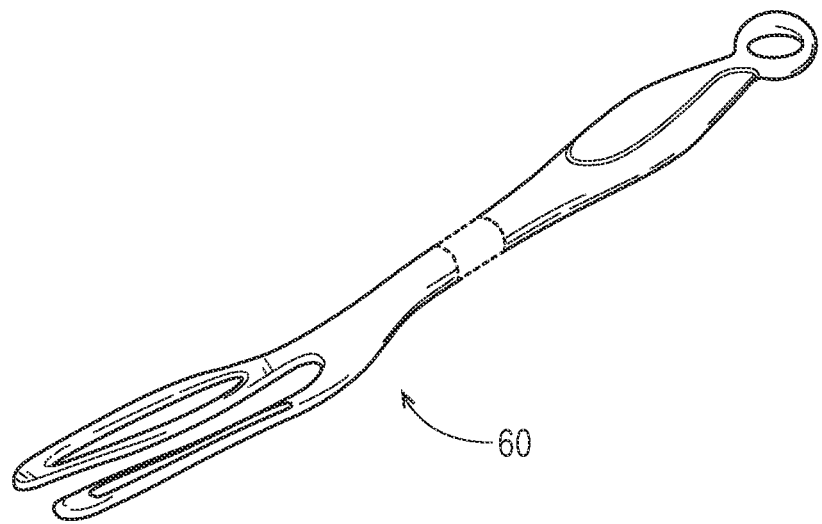
FIG. 6 is a perspective view of a handle usable with the present invention.

Referring to FIG. 6, the cleaning article 10 may be removably attachable to a handle 60. Particularly, an attachment system may provide for removable attachment of the cleaning article 10 to a suitable and optional handle 60. The cleaning article 10 attachment system and optional complementary handle 60 attachment may comprise adhesive joining, cohesive joining, mechanical engagement through sleeves, etc. One common attachment system comprises sleeves into which the tine[s] of the handle 60 may be inserted. Suitable handles 60 are disclosed in commonly assigned U.S. Pat. Nos. 8,578,564 and D674,949 S.

Figure 7:
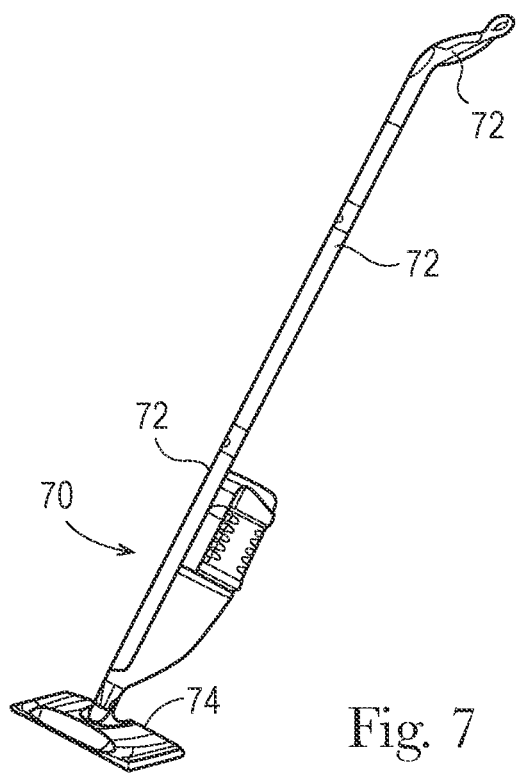
FIG. 7 is a perspective view of a floor cleaning implement usable with the present invention.

Referring to FIG. 7, the cleaning article 10 may be removably attachable to an implement 70. Particularly, a floor cleaning implement 70 may allow for cleaning of the floor while the user is upright, and may also provide for spraying of cleaning solution or other liquid to the floor. A typical floor cleaning implement 70 has a handle 72 for grasping by the user and a head 74 attached thereto, and preferably pivotally attached thereto. The head 74 moves against the floor, or other target surface. The cleaning implement 70 may be removably attached to the bottom of the head. Preferably the strips 17 are bounded by the footprint of the head 74 in use, promoting dynamic movement of the strips 17 during cleaning.

Removable attachment of the cleaning article 10 to the implement 70 may be accomplished using adhesive, hook and loop systems, and grippers. Grippers and a suitable cleaning implement 70 are disclosed in commonly assigned U.S. Pat. No. 6,484,356. A suitable vacuum implement 70 is disclosed in U.S. Pat. No. 7,137,169. Suitable spray implements 70 are disclosed in commonly assigned U.S. Pat. Nos. 5,888,006; 5,988,920; 6,842,936; 7,182,537; 7,536,743; 7,676,877 and 8,186,898.

The cleaning article 10 may also be used manually, without a handle 60 or implement 70. If desired, various cleaning articles 10 described herein may be packaged and sold in a kit. This arrangement provides the benefit that the user has a choice of different cleaning articles 10 for different tasks. For example, if desired, plural sizes of the cleaning articles 10 may be sold together as a single kit. This arrangement allows the user to select the particular cleaning article 10 best suited for the immediate task.

The cleaning article 10 of the present invention is believed to address the unmet need for cleaning modern wood/laminates. A particular cleaning article 10 is constructed with 10 layers 27 of strips 17. Each strip 17 is about 7 mm in width. All 10 layers 27 are joined at a central bond 38. The four layers 27 adjacent and closest to sheet 12 are also joined thereto with additional bonds 38, disposed transversely outboard of the central bond 38.

The cleaning article 10 according to the present invention, described above, and two commercially available control samples were tested. The first control sample was a WetJet floor sheet, marketed by the instant assignee. This sample contained AGM and is generally considered disposable. The second control sample was a microfiber floor sheet marketed by Bona and is generally considered re-usable for multiple cleaning tasks. It is believed these two samples represented a broad spectrum of disposable and reusable floor sheets.

The tests were conducted on a 6 mm thick transparent polycarbonate plexi-glass surface disposed on matte black card stock. For each sample tested, the gloss of this surface was measured using a BYK-Gardner gloss meter.

A BYK-Gardner™ 'Scrub' Abrasion Tester scrubbing machine was used for consistency between samples. After an initial gloss measurement, the surface was treated with 2 mls of a common cleaning solution, marketed under Swiffer brand as WetJet liquid and generally equally sprayed over the test surface. A weight of 200 grams was placed on each sample. Each sample was cycled back and forth 50 times. The tested surface was then allowed to air dry. The surface was tested for final gloss, and the respective readings subtracted.

No soil was used for this test. Thus, a change in gloss represents surface damage caused by the respective samples.

Four replicates were tested for each sample. Each replicate was tested on three different locations of the test surface, to determine the effect on gloss. The results are shown in Table 2. Thus, each entry for change in gloss represents an average of 12 data points. Relative surface area of the samples was also determined.

TABLE 2

|  | Initial Gloss Average/Std dev (unitless) | Final Gloss Average/Std dev (unitless) | Change in gloss (unitless) | Normalized Surface Area |
|---|---|---|---|---|
| Control 1 WetJet commercially available floor sheet code 41764787420320 | 125.5/0.45 | 121.1/0.95 | −4.4 | 1 |
| Control 2 Bona Microfiber commercially available floor sheet Item #AX0003053 | 125.5/0.45 | 118.4/0.73 | −7.1 | 3.3 |
| Invention | 125.5/0.45 | 125.0/0.45 | −0.5 | 10 |

The data in Table 2 show that Bona micro-fiber samples disadvantageously cause significant decline in gloss when tested as described above. The WetJet sample causes a smaller loss in gloss than the Bona microfiber sample. The loss in gloss indicates surface damage can occur by ordinary cleaning on an unsoiled test surface. Without being bound by theory it is believed the greater surface damage from the microfiber sample may be due containing relatively abrasive materials, such as nylon.

Surprisingly, the invention samples show minimal loss in gloss, having a difference almost within the standard deviation. Without being bound by theory it is believed the lesser surface damage from the microfiber sample may be due the benefits of having mobile strips 17, which present a dynamic surface area to the target surface in use.

The above test was repeated using 0.77 square meters of RN 104577 Santos Mahogany engineered hardwood plank laminate wood flooring distributed by Home Legend of Fontana, Calif. This flooring was spiked with soil containing about 2% Ultra Fine Dust (clay soil sold by PTI soils) suspended in a water/alcohol solution. About 2 mls of this solution was applied to the test surface using a paint roller and allowed to air dry. The soil was then re-wetted with 2 mls of cleaning solution. Each sample was then cycled back and forth 25 times on this flooring. The resulting gloss differential between samples is shown in Table 3 below.

TABLE 3

| Soiled Surface Damage Testing | Initial Gloss Average/Std dev (unitless) | Final Gloss Average/Std dev (unitless) | Change in gloss (unitless) |
| --- | --- | --- | --- |
| Control 1 WetJet commercially available floor sheet code 41764787420320 | 90.7/0.4 | 85.6/0.95 | −5.1 |
| Control 2 Bona Microfiber commercially available floor sheet Item #AX0003053 | 91.6/0.5 | 87.4/0.73 | −4.2 |
| Invention | 91.0/0.45 | 90.8/0.5 | −0.2 |

Table 3 shows that he inventive cleaning article 10, even in presence of more rigorous testing with particulate soil on a newer floor material, minimized potential for surface damage relative to control samples.

Figure 8:
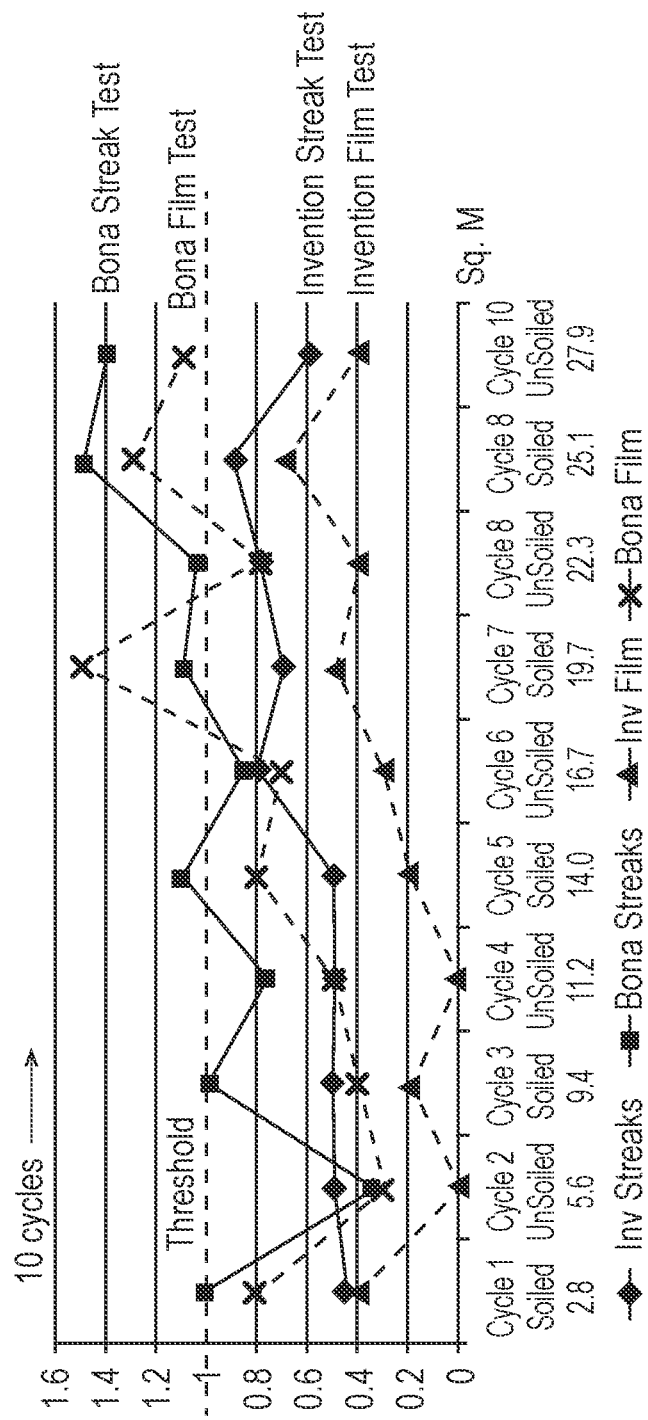
FIG. 8 is a graphical representation of the streaking and filming performance of a commercially available floor sheet and a sample according to the present invention.

Referring to FIG. 8, the Bona floor sheet and a floor sheet 10 according to the present invention were tested for 10 cycles each on the aforementioned RN 104577 Santos Mahogany engineered hardwood plank flooring. The flooring was divided into two halves, with each half being used for one sample. The flooring was cleaned with and initial gloss recorded. An solution of soil, oil and isopropyl alcohol was applied to the flooring and air dried. Commercially available WetJet cleaning liquid, sold by the instant assigned was sprayed onto the test surface.

Each sample was tested with eight back and forth wipes in each direction to cover about 2.8 square meters, representing one cycle. After each cycle, the test surface was measured for both filming, i.e. the appearance of haze, and for streaking. The process was repeated with the same sample, until 10 cycles were completed.

FIG. 8 shows that the commercially available Bona microfiber sample exhibited both streaking and hazing above the subjective visible detection threshold. Both properties generally increased in the unfavorable direction throughout the test. In contrast, the cleaning article 10 according to the present invention advantageously exhibited both streaking and hazing well below the visible detection threshold [1 on a unitless scale] throughout all 10 cycles.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An elongate cleaning article for cleaning a target surface, said cleaning article comprising:
   a nonwoven sheet, said nonwoven sheet having an inwardly oriented face and an outwardly oriented face opposed thereto;
   an absorbent core joined to said inwardly oriented face of said sheet; and
   a cellulosic gather strip element joined to said core at a central bond, said gather strip element comprising at least three independent layers folded upon one another in at least a c-fold, each said layer having strips extending outwardly from said bond,
   wherein each of said layers is joined to said core by said central bond and at least one of said layers is joined to said sheet by an additional bond not common to each layer; and
   wherein two bonds outboard of said central bond join at least two said layers proximate said core to said sheet and not to said core.

2. An elongate cleaning article according to claim 1 wherein said core has a core width, and said gather strip element has a gather strip element width greater than said core width.

3. An elongate cleaning article according to claim 2 wherein said bond is an elongate, non-straight bond.

4. An elongate cleaning article according to claim 1 being removably attached to a cleaning implement, said cleaning implement comprising a head and handle pivotally attached thereto, said head removably receiving said cleaning article.

* * * * *